(12) United States Patent
Sano et al.

(10) Patent No.: US 9,227,591 B2
(45) Date of Patent: Jan. 5, 2016

(54) AIRBAG AND AIRBAG DEVICE PROVIDED WITH THE AIRBAG

(71) Applicant: NIHON PLAST CO., LTD., Fujinomiya-shi, Shizuoka (JP)

(72) Inventors: Kei Sano, Fujinomiya (JP); Yohei Kiuchi, Fujinomiya (JP); Akito Urushibata, Fujinomiya (JP); Hidenobu Suzuki, Fujinomiya (JP); Minoru Oda, Fujinomiya (JP); Hideki Mochizuki, Fujinomiya (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 14/500,575

(22) Filed: Sep. 29, 2014

(65) Prior Publication Data

US 2015/0091285 A1 Apr. 2, 2015

(30) Foreign Application Priority Data

Sep. 30, 2013 (JP) .................................. 2013-204836

(51) Int. Cl.
| | |
|---|---|
| *B60R 21/16* | (2006.01) |
| *B60R 21/237* | (2006.01) |
| *B60R 21/205* | (2011.01) |
| *B60R 21/231* | (2011.01) |
| *B60R 21/235* | (2006.01) |

(52) U.S. Cl.
CPC ............ *B60R 21/237* (2013.01); *B60R 21/205* (2013.01); *B60R 21/231* (2013.01); *B60R 2021/23576* (2013.01)

(58) Field of Classification Search
USPC .................... 280/740, 741, 742, 743.1, 743.2
See application file for complete search history.

(56) References Cited

U.S. PATENT DOCUMENTS

| 7,195,275 | B2 * | 3/2007 | Abe .............................. 280/729 |
| 8,011,691 | B2 * | 9/2011 | Urushibata et al. ......... 280/743.2 |
| 8,864,170 | B2 * | 10/2014 | Yamada et al. ............. 280/743.2 |
| 2006/0049618 | A1 * | 3/2006 | Bito .............................. 280/732 |

FOREIGN PATENT DOCUMENTS

| JP | 11278192 A | 10/1999 |
| JP | 4465873 B2 | 5/2010 |

* cited by examiner

*Primary Examiner* — Toan To
(74) *Attorney, Agent, or Firm* — Arent Fox LLP

(57) ABSTRACT

An airbag according to the present invention has: an airbag main body that is provided with a gas introduction opening; and an inner cloth portion that is arranged to cover the gas introduction opening in the airbag main body. The inner cloth portion has a first and a second opening end parts, and is fixed to a peripheral edge part of the gas introduction opening of the airbag main body while a position of the inner cloth portion is superimposed with the gas introduction opening of the airbag main body. In this manner, an airbag is caused to inflate and expand more speedily and widely in a direction which is orthogonal to an occupant's side direction, and an occupant can be buffered and supported in a stable manner so as to have a wide area from a front side irrespective of whatsoever posture seated by the occupant may be.

6 Claims, 6 Drawing Sheets

AIRBAG AND AIRBAG DEVICE PROVIDED WITH THE AIRBAG

CROSS REFERENCE TO RELATED APPLICATIONS

This application claims priority of Japanese Patent Application No. 2013-204836 filed on Sep. 30, 2013. The contents of this application are incorporated herein by reference in their entirety.

BACKGROUND OF THE INVENTION

1. Field of the Invention

The present invention relates to an airbag and an airbag device provided with the airbag, that are configured to control a flow of an inflation gas to be supplied to the airbag, and that are capable of preventing an occurrence of an undesirable circumstance such as hitting of the airbag against somewhere under the jaw of the occupant and safely buffering and supporting an occupant, even in a case where the occupant is seated in proximity to an instrument panel.

2. Description of the Related Art

At present, as a safety device configured to protect an occupant in a case where a vehicle such as a motor vehicle collides with any obstacle, an airbag device is equipped in front of a driver's seat and a passenger's seat. In general, when a vehicle collides with any obstacle and then is subject to a significant impact, this airbag device detects such an impact, generates a high pressure gas from an inflator, and introduces the gas into the airbag, thereby momentarily expanding and inflating the airbag. In this manner, an occupant is buffered and supported by the airbag, and an impact force which is applied to a human body can be significantly mitigated; and therefore, the safety of the occupant at the time of collision is ensured.

Conventionally, in an airbag device for passenger's seat, an airbag is retracted and housed in a case which is disposed inside of an instrument panel, and is arranged so as to protrude an opening on a front face side of the instrument panel at the time of the inflow of an inflation gas and then expand and inflate at a rear side of a vehicle.

Accordingly, in the airbag of such type, it has been a common routine to expand and inflate the airbag so as to be moved to the rear side of the vehicle in a state in which movement prior to the completion of the expansion and inflation at each portion at a wall portion on the occupant's side is restrained to its required minimum while a wide face on which the wall portion on the occupant's side is taken along a direction which is orthogonal to a direction in which the airbag faces the occupant (for example, a rear side of the vehicle, and hereinafter, this direction is referred to as an occupant's side direction) is ensured from a state prior to the completion of the expansion and inflation of the airbag by taking an account into a folded shape of the airbag (reference should be made to Japanese Patent No. 4465873) or disposing a rectification cloth in the airbag (reference should be made to Japanese Unexamined Patent Application Publication No. 11-278192), etc.

However, in the airbag device of Japanese Patent No. 4465873 that is provided in such a manner that the airbag is first folded in a vertical direction (folded laterally) and then folded in a transverse direction (folded longitudinally) or in the airbag device of Japanese Unexamined Patent Application Publication No. 11-278192 that is provided in such a manner that a rectification cloth is provided inside of the airbag so as to diverge the hot air or high pressure gas that is blown out to the inside of the airbag, in a vertical direction of the airbag by the rectification cloth, there has been a need to make a contrivance for the layout at the periphery of a front sheet of a vehicle including the disposition or mode of the instrument panel, or alternatively, to employ a specific control device or a specific structure in order to appropriately protect the occupant irrespective of whatsoever posture seated by the occupant may be when the airbag inflates and expands.

As a result, a design of the vehicle or disposition of a variety of parts is limited, and there has been a case in which a degree of freedom in its related design lowers or a case in which its related manufacturing costs increase. Thus, there has been a desire to develop an airbag device which is capable of speedily inflating and expanding an airbag in a direction which is orthogonal to the occupant's side direction with a simpler structure.

SUMMARY OF THE INVENTION

Accordingly, it is an object of the present invention to provide an airbag and an airbag device which are capable of speedily and widely inflating and expanding the airbag in a direction which is orthogonal to an occupant's side direction with a simple structure without a need to employ a specific control device or the like, the airbag and the airbag device being capable of buffering and supporting an occupant in a stable manner from a front side irrespective of whatsoever posture seated by the occupant may be.

In order to solve the problem described above, an airbag which is provided according to the present invention is most primarily characterized by comprising: as essential constituent elements,
  an airbag main body which is provided with a gas introduction opening of an inflation gas; and
  an inner cloth portion which is mounted and fixed so as to cover the gas introduction opening in the airbag main body, the airbag main body being caused to be inflate and expand by the inflation gas,
  wherein the inner cloth portion comprises:
    a first opening end part at which one end in a lengthwise direction opens as a gas outflow opening; and
    a second opening end part at which the other end in the lengthwise direction opens as a gas outflow opening,
  wherein a mounting and fixing portion of the inner cloth portion is fixed to a circumferential edge part of the gas introduction opening of the airbag main body while a position of the inner cloth portion is superimposed with the gas introduction opening of the airbag main body, and
  wherein the first opening end part and the second opening end part of the inner cloth portion is folded in a predetermined procedure together with the airbag main body in a state in which the first and second end parts are sandwiched between base cloths constituting the airbag main body.

In addition, in the airbag of the present invention, it is preferable that the inner cloth portion be arranged so that the first opening end part and the second opening end part are oriented in a vertical direction.

In this case, it is preferable that the airbag comprise: a first winding portion which is folded and formed with the airbag main body being oriented in a vertical direction while the first opening end part and the second opening end part of the inner cloth portion are wound at a fold taken along a transverse direction; and a second winding portion which, after the first winding portion has been formed, is folded and formed with the airbag main body being oriented in a transverse direction at a fold taken along the vertical direction.

Further, in the airbag device of the present invention, it is preferable that: the inner cloth portion be constructed in a cylindrical shape by employing a base cloth formed in a rectangular shape so as to thereby overlap terminal edge parts of two edges which are opposite to each other, of the same base cloth, and then, jointing the terminal edge parts that are overlapped with each other; and that the jointing between the terminal edge parts of the inner cloth portion have a strength which is breakable while inflation and expansion of the airbag are in progress.

Furthermore, according to the present invention, there is provided an airbag device which is most primarily characterized by comprising:

an airbag that is provided with the constituent elements described above;

an inflator configured to generate an inflation gas; and a retainer configured to retain the inflator and the airbag, wherein the inflation gas is supplied into the inner cloth portion and then flows into the airbag main body via the gas outflow opening of a respective one of the first and second opening end parts of the inner cloth portion to thereby cause the airbag main body to inflate and expand.

In an airbag which is provided according to the present invention, although a cylindrical inner cloth portion configured to cover a gas introduction opening of an airbag main body is mounted and fixed in the airbag main body that is constructed by employing a plurality of base cloths, this cylindrical inner cloth portion has: a first opening end part at which a gas outflow opening is formed at each end in a lengthwise direction of the inner cloth portion, and which is provided in one gas outflow opening; a second opening end part which is provided with the other gas outflow opening; and an inner opening portion configured to open in a region between the first opening end part and the second opening end part, both of which are mounted and fixed to the airbag main body.

In addition, the cylindrical inner cloth portion is mounted in the airbag main body by fixing a mounting and fixing portion to a circumferential edge part of a gas introduction opening of the airbag main body by way of sewing or the like while a position of an inner opening portion is associated with the gas introduction opening of the airbag main body. Further, the first and second opening end parts of the inner cloth portion that is arranged in the airbag main body are folded in a predetermined procedure together with the airbag main body in a state in which the first and second opening end parts are sandwiched between base cloths constituting the airbag main body when the airbag main body is folded in a predetermined procedure.

According to such an airbag of the present invention, the inflation gas that is generated in an inflator is supplied into the airbag through the inner cloth portion. In this case, although the inner cloth portion first inflates and expands, the first opening end part and the second opening end part of the inner cloth portion are folded together with the airbag main body as described above.

Thus, the inner cloth portion inflates, whereby folding of the first and second opening end parts of the inner cloth portion actively widens (expands), and at the same time, folding of a fold portion of the airbag main body that is folded together with the first and second opening end parts also widens (expands) and thus the expansion in a direction which is orthogonal to the occupant's side direction of the airbag main body is accelerated, and the airbag main body can be caused to inflate and expand more speedily in the direction that is orthogonal to the occupant's side direction at an initial state of inflation Further, if folding of the first and second opening end parts of the inner cloth portion is eliminated, an inflation gas can be blown out to the inside of the airbag main body toward the direction that is orthogonal to the occupant's side direction; and therefore, the airbag can be caused to expand and inflate toward a rear side of a vehicle while inflation and expansion of the airbag in the direction that is orthogonal to the occupant's side direction is further accelerated.

Thus, the airbag of the present invention is capable of speedily and widely inflating and expanding the airbag in the direction that is orthogonal to the occupant's side direction and then moving a wall portion on the occupant's side of the airbag (an occupant opposite portion) to the rear side of the vehicle with a simple structure without a need to employ a specific control device or the like. In this manner, even in a case where an occupant is seated in proximity to an instrument panel or is seated at a forward bent posture, the occupant is buffered and supported in a stable manner from a front side in a large area by the airbag of the present invention, and the safety of the occupant can be appropriately ensured.

In such an airbag of the present invention, the inner cloth portion is arranged so that the first opening end part and the second opening end part are oriented in a vertical direction.

It is to be noted that, in the present specification, a term "front side" as used herein is mainly referred to as a direction in which an inflator is arranged with respect to an airbag, and a term "rear side" as used herein is mainly referred to as a direction in which an airbag inflates and bursts out from an opening portion of an instrument panel. In addition, a term "occupant's side direction" as used herein is mainly referred to as a rear side in order to clarify an explanation in the present invention, although the direction depends on a layout or an orientation of an airbag device.

In addition, a term "transverse direction" as used herein is referred to as a direction which is orthogonal to the forward and backward direction described above, the direction being taken along a vehicle widthwise direction, and the left side and right side when the airbag is seen from the occupant's side is respectively referred to as a leftward direction and a rightward direction. Further, a term "vertical direction" as used herein is referred to as a direction which is orthogonal to a respective one of the forward and backward direction and transverse direction as described above, and this term is also referred to as a direction taken along a vehicle height direction, for example.

As described above, the inner cloth portion is arranged so that the first and second opening end parts are oriented in the vertical direction, whereby, when the inner cloth portion is caused to inflate by supply of an inflation gas, the flow of the inflation gas that is blown out from the inner cloth portion can be oriented in a stable manner in the vertical direction. Thus, expansion of the airbag in the vertical direction is actively accelerated, and the airbag can be caused to speedily inflate and expand in the vertical direction before the airbag comes into contact with an occupant, for example. In this manner, it is possible to reliably prevent an occurrence of an undesirable circumstance that the airbag in inflation and expansion hits somewhere under the jaw of the occupant and then pushes up the head part of the occupant.

In addition, in this case, the airbag of the present invention has: a first winding portion which is folded and formed with the airbag main body being oriented in a vertical direction while the first opening end part and the second opening end part of the inner cloth portion are wound at a fold taken along a transverse direction; and a second winding portion which, after the first winding portion has been formed, is folded and formed with the airbag main body being oriented in a transverse direction at a fold taken along the vertical direction.

In this manner, if an inflation gas is supplied and then the inner cloth portion expands and inflates, folding of the first and second opening end parts of the inner cloth portion is eliminated, and the flow of the inflation gas is oriented in the vertical direction by the inner cloth portion, and at the same time, the airbag expands so as to first eliminate folding of the second winding portion that is folded in the transverse direction later.

Therefore, the airbag is caused to speedily inflate so as to be oriented in the vertical direction, as described above, and the expansion in the transverse direction is also speedily carried out at a time point which is earlier than that of the expansion of the airbag in the vertical direction; and accordingly, the occupant can be buffered and supported in a stable manner so as to have a larger area from the front side by the airbag having opened in the transverse direction and the vertical direction which are orthogonal to the occupant's side direction.

Further, in the airbag of the present invention, the inner cloth portion is constructed in a cylindrical shape by employing one rectangular base cloth to thereby overlap terminal edge parts of two sides which are opposite to each other of the same base cloth and then jointing the terminal edge parts overlapped with each other, and the jointing between the terminal edge parts of the inner cloth portion have a strength which is breakable while inflation and expansion of the airbag are in progress.

That is, in the airbag of the present invention, a joint portion of the inner cloth portion is maintained at a stage at which folding of the airbag is eliminated, for example, that is, at a stage at which the airbag is expanded in a direction which is orthogonal to the occupant's side direction (in the vertical direction or in the transverse direction); the flow of the inflation gas as described above can be controlled by the inner cloth portion; and then, at a stage at which the airbag expands up to a certain degree of wideness and then is caused to inflate so as to be oriented in the occupant's side direction (the rear side of the vehicle), the joint portion of the inner cloth portion is constructed so as to break while the joint portion is subjected to a temperature and a pressure of the inflation gas, a respective one of which gradually increases.

In this manner, the joint portion of the inner cloth portion breaks in the course of inflation and expansion of the airbag, thereby making it possible to prevent a local concentration of the inflation gas with respect to the airbag main body; and therefore, there is no need to provide a partial reinforcement with respect to the airbag main body, and the expansion and inflation that are oriented in the occupant's side direction of the airbag can be smoothly carried out at a predetermined behavior.

In addition, according to the present invention, there is provided an airbag device comprising: an airbag which is provided with the construction described above; an inflator configured to generate an inflation gas; and a retainer configured to retain the inflator and the airbag, wherein the inflation gas is supplied into the inner cloth portion and then flows into the airbag main body via the gas outflow opening of a respective one of the first and second opening end parts of the inner cloth portion, whereby the airbag main body inflates and expands.

Such an airbag device of the present invention is capable of inflating an airbag so as to be oriented in an occupant's side direction while speedily and widely expanding the airbag in a direction which is orthogonal to an occupant's side direction with a simple structure without a need to employ a specific control device or a specific structure or the like. Thus, an occupant can be buffered and supported in a stable manner so as to have a large area from the front side by the airbag irrespective of whatsoever posture seated by the occupant may be; and therefore, the safety of the occupant can be appropriately ensured.

DESCRIPTION OF THE PREFERRED EMBODIMENTS

Hereinafter, embodiments of the present invention will be described in detail with reference to the accompanying drawings.

Figure 1:
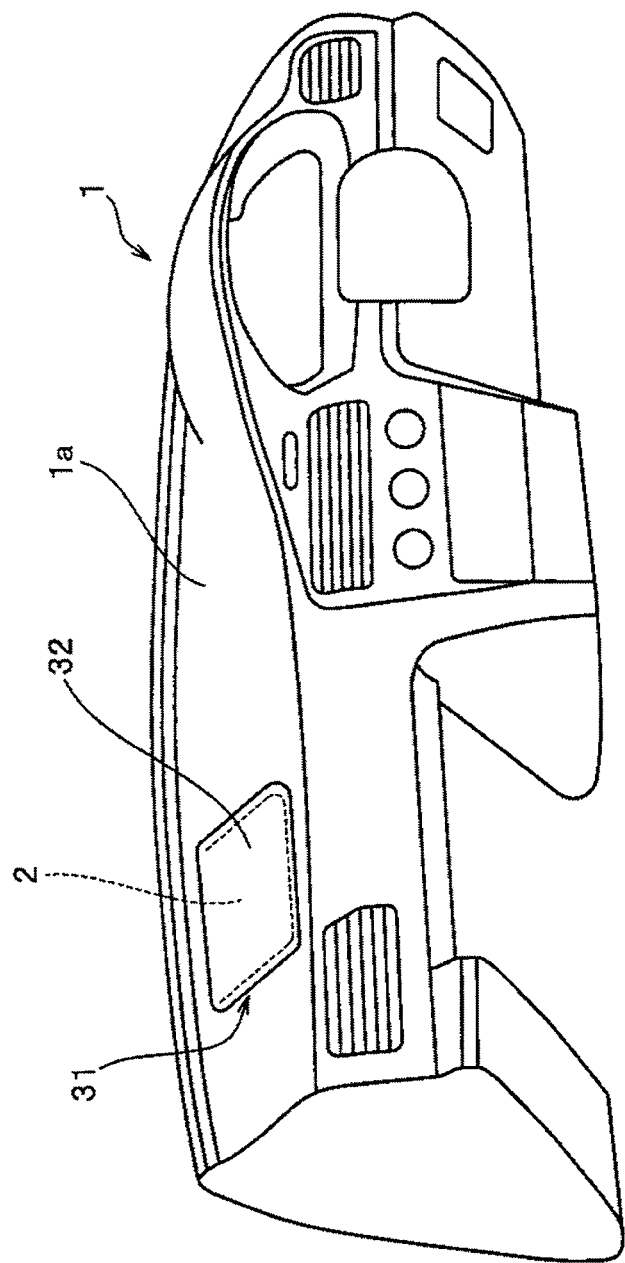
FIG. 1 is a perspective view showing an instrument panel to which an airbag device according to an embodiment of the present invention is mounted.
Figure 2:
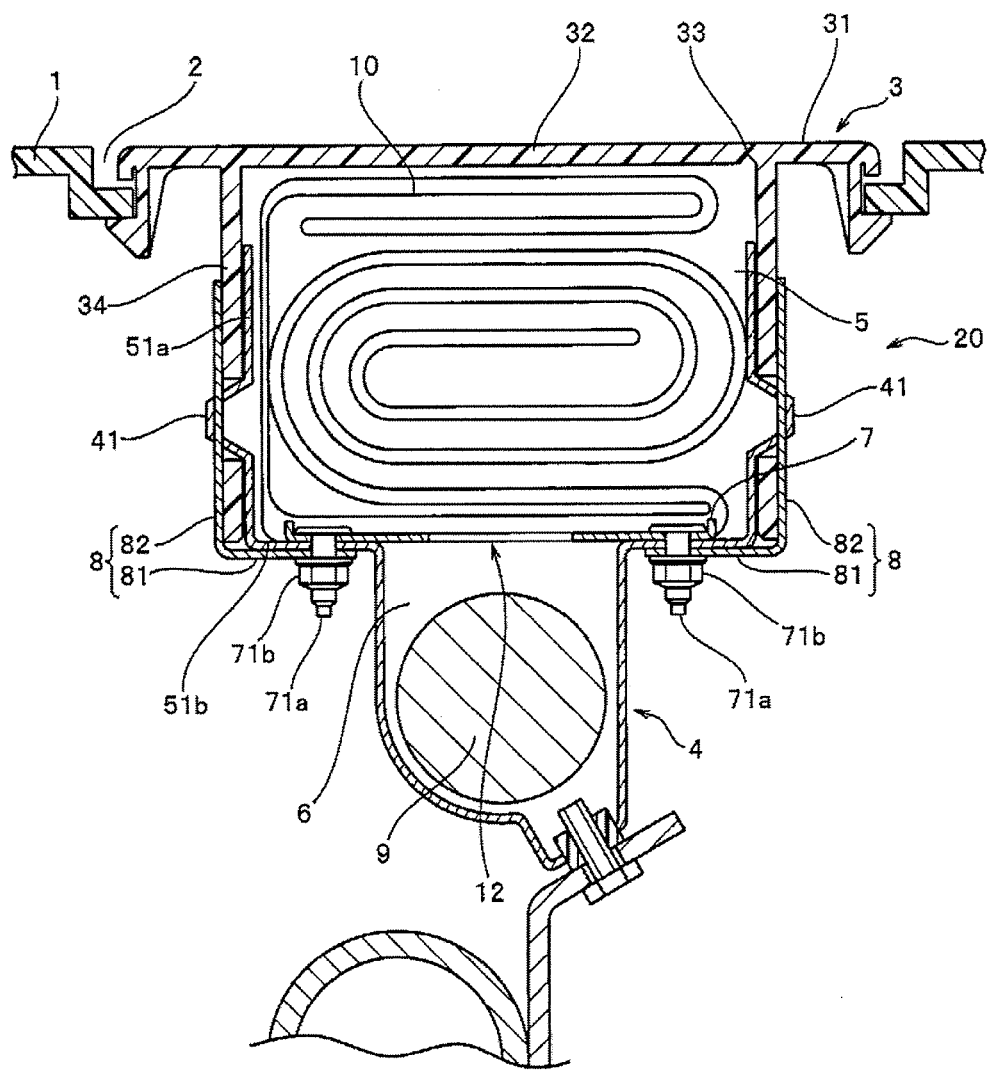
FIG. 2 is a sectional view in a direction which is orthogonal to a vehicle widthwise direction, the view showing a use mode of the same airbag device.
Figure 3:
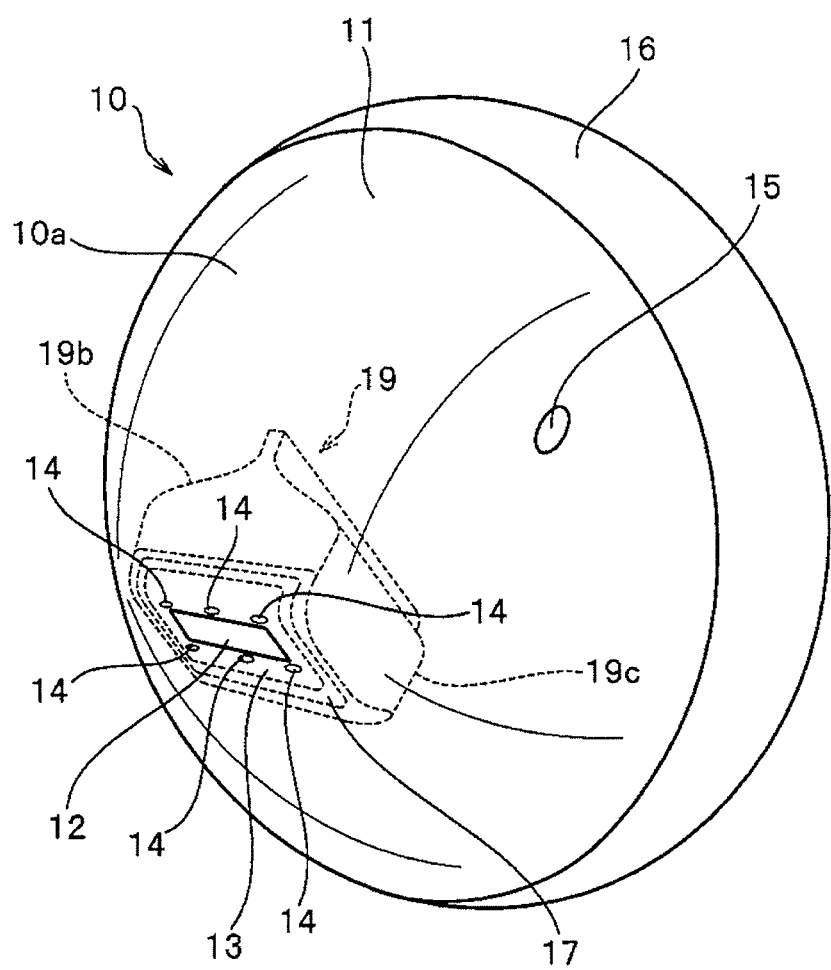
FIG. 3 is a perspective view of a state in which an airbag of the same airbag device is caused to expand and inflate solely.
Figure 4:
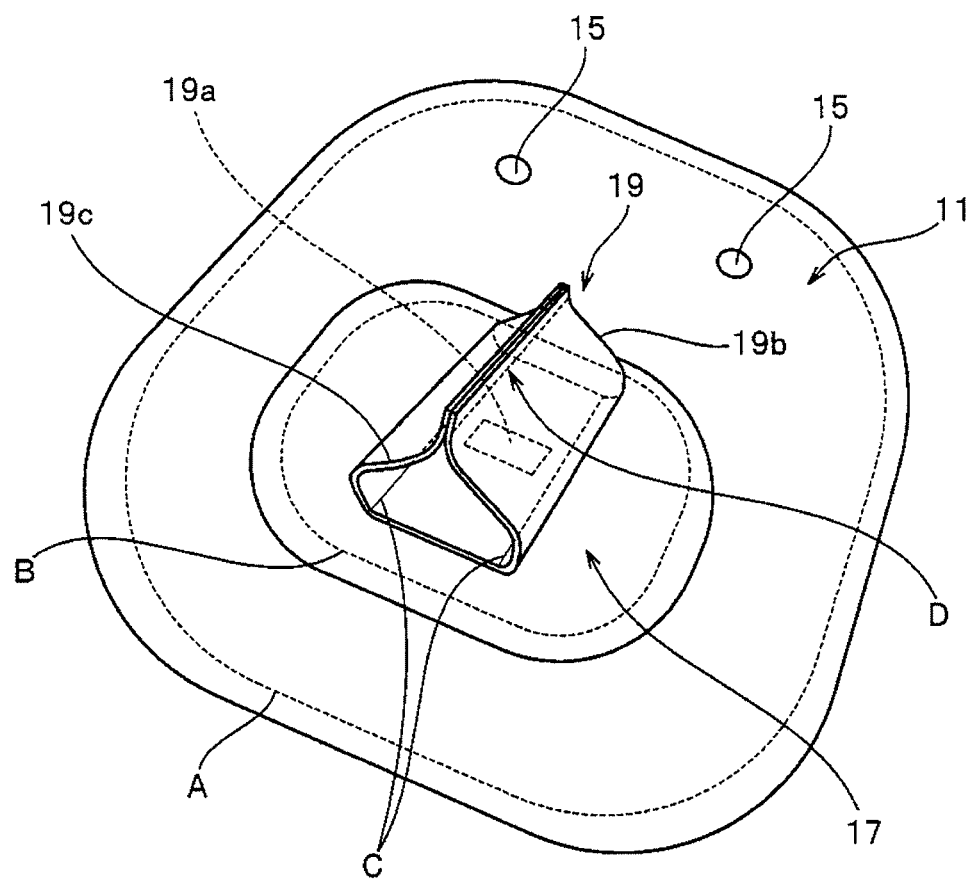
FIG. 4 is a perspective view showing an inner cloth portion which is arranged in an airbag main body of the same airbag.
Figure 5:
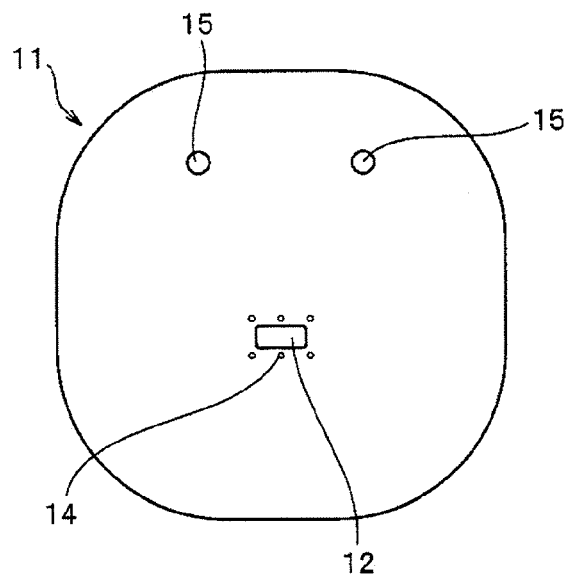
FIG. 5 is a plan view showing constituent elements of the same airbag in an exploded manner.
Figure 5:
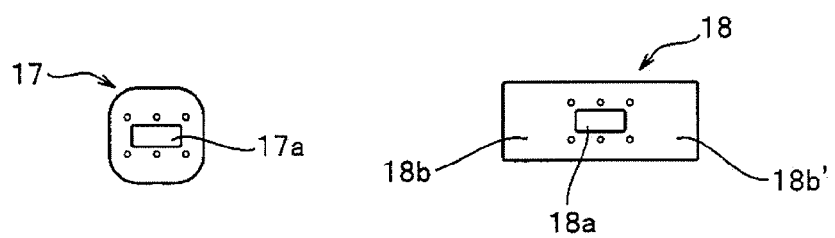
Figure 5:
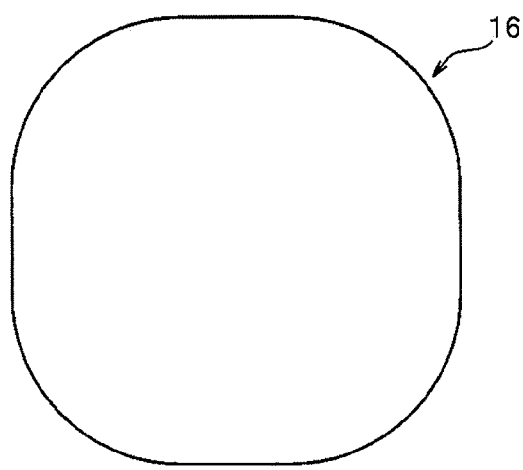

Here, FIG. 1 is a perspective view showing an instrument panel to which an airbag device 20 according to the present embodiment is mounted. FIG. 2 is a sectional view in a direction which is orthogonal to a vehicle widthwise direction, the view showing a use mode of the airbag device 20. FIG. 3 is a perspective view of a state in which an airbag of the airbag device 20 is caused to expand and inflate solely. In addition, FIG. 4 is a perspective view showing an inner cloth portion which is arranged in an airbag main body of the airbag, and FIG. 5 is a plan view showing constituent elements of the airbag in an exploded manner.

The airbag device 20 of the present embodiment, as shown in FIG. 1 and FIG. 2, is of a top mount type which is disposed inside of the side of a top face 1a in a surface of an instrument panel 1. This airbag device 20 is constructed with: an airbag 10 which is folded in a predetermined procedure; a cylinder type inflator 9 configured to supply an inflation gas to the airbag 10; a case 4 configured to house and retain the airbag 10 and the inflator 9; a retainer 7 for mounting the airbag 10 to the case 4; an airbag cover 3 configured to cover the folded airbag 10; and two presser plates 8 for rigidly coupling the airbag cover 3 to the case 4.

The retainer 7 configured to mount the airbag 10 to the case 4 is constructed with a plurality of mounting bolts 71a which is made of a rectangular ring-shaped metal plate, the mounting bolts extending downward to their predetermined positions. The retainer 7 is mounted to the case 4 by inserting the mounting bolts 71a into mounting holes 14, which will be described later, of the airbag 10, and then, inserting these mounting bolts into bottom wall portions 51 of the case 4 or into lateral plate portions 81 of the presser plates 8, and thereafter, screwing the nuts 71b to the respective mounting bolds 71a, The inflator 9 is housed and retained in a lower chamber 6 of the case 4. It is to be noted that, in the present embodiment, there is illustrated a case in which a cylinder type inflator is employed as the inflator 9, whereas in the present invention, there may be used a disk type inflator formed in an external shape of a substantially columnar shape.

The airbag cover 3 has: a ceiling wall portion 31 which is formed of a thermoplastic elastomer such as an olefin-based or ester-based elastomer or the like, the ceiling wall portion being disposed so as to close an opening 2 configured to open in a rectangular shape of the instrument panel 1; and a side wall portion 34 formed in a substantially square-section cylindrical shape, the side wall portion extending downward from a lower face of the ceiling wall portion 31.

The ceiling wall portion 31 is caused to dispose a thin predetermined breakage portion 33 at the periphery of the wall portion, the inside of which is surrounded by the side wall portion 34, and to arrange one door portion 32. This door portion 32 rotates a terminal edge part of a proximal side of the door portion as a hinge portion when the predetermined breakage portion 33 is pressed by the airbag 10 that expands and inflates and then breaks and opens to a front side of a vehicle. It is to be noted that, although the airbag cover 3 of the present embodiment is formed separately from the instrument panel 1, the present invention is not limited thereto, and an airbag cover may be formed integrally with an instrument panel so as to constitute a part of the instrument panel.

The presser plates 8 are respectively disposed in sites in a vehicle forward and backward direction of the case 4, a respective one of which is formed as a sectional L-shape provided with a lateral plate portion 81 and a longitudinal plate portion 82 which extends upward from an end part of the lateral plate 81. In addition, in a respective one of the lateral plate portions 81, a through hole (although its related view and reference numeral are not shown) configured to insert a respective one of the mounting bolts 71a of the retainer 7 is formed, and a top end of a respective one of the longitudinal plate portions 82 is formed in such a manner as to be able to be inserted into an engagingly lock protrusion 41 of the case 4.

The case 4 has: an upper chamber 5 which is formed in a rectangular parallelepiped shape of which an upper side is opened; and a lower chamber 6 which is disposed on a lower side of the case 4 so as to communicate with the upper chamber 5. The upper chamber 5 is composed of: a peripheral wall portion 51a which is formed in a substantially square-section cylindrical shape; and a bottom wall portion 51b which is disposed at a lower part of the peripheral wall portion 51a. In the bottom wall portion 51b, there is formed a through hole (although its related view and reference numeral are not shown) for inserting a respective one of the mounting bolts 71a of the retainer 7.

The airbag 10 has: an airbag main body 10a; an inner cloth portion 19 which is arranged in the airbag main body 10a; and a reinforcement cloth (also referred to as a protection cloth or a reinforcement patch) 17 which is interposed between the airbag main body 10a and the inner cloth portion 19. The airbag main body 10a, which will be described later, is formed by sewing a peripheral edge part of a first cloth 11 formed in a substantially circular shape, the first cloth constituting a front side halve portion, and a peripheral edge part of a second base cloth 16 constituting a rear side halve portion with each other, and as shown in FIG. 3, this airbag main body has a bag-shaped mode to such an extent as to circularly inflate and expand in a three-dimensional manner so that a center portion rises. Also, inside of the airbag main body 10a, there is mounted an inner cloth portion 19 configured to carry out rectification while changing the flow of an inflation gas flowing into the airbag 10.

Also, a gas introduction opening 12 configured to open in a rectangular shape and configured to flow the inflation gas that is generated in the inflator 9 into the airbag 10 is provided at a front side lower halve portion of the airbag main body 10a (in particular, at a front end part of a center part in a widthwise direction in the front side lower halve portion). In the case of the present embodiment, this gas introduction opening 12 is provided in a region which is somewhat lower than a center part of the first base cloth 11.

In addition, a plurality of mounting holes 14 are punched in a peripheral edge part of a gas introduction opening 12, the respective mounting holes 71a of the retainer 7 are inserted into these mounting holes 14, and the airbag 10 is retained at the bottom wall portion 51b of the case 4. Further, vent holes 15 configured to evacuate a redundant inflation gas are provided in their predetermined positions on the leftward and rightward lateral sides in the front side halve portion of the airbag main body 10a.

Such an airbag main body 10a, as shown in FIG. 4, is manufactured by sewing, at a joint seam A, a first base cloth 11 and a second base cloth 16, respective one of which is knitted by employing a yarn made of a material such as polyamide or polyester, and the first base cloth 11 and the second base cloth 16 are formed so as to be able to sew the airbag 10 in a three-dimensional manner by way of a planar sewing work.

The inner cloth portion 19 is a member which is arranged in the airbag main body 10 composed of the first base cloth 11 and the second base cloth 16, the member being configured to guide the inflation gas that is supplied into the airbag main body 10a, in a predetermined direction. This inner cloth portion 19, as shown in FIG. 3 and FIG. 4, is constructed by forming, in a cylindrical shape, a base cloth knitted by employing a yarn for which a material is the same as that for the airbag main body 10a, and an upper end part and a lower end part of the cylinder are fanned as upper and lower opening end parts 19b, 19c, configured to open as gas outflow openings, respectively.

Also, in this cylindrical inner cloth portion 19, a region of a part in a barrel portion of the cylinder is fanned as a mounting and fixing portion (a bottom face portion) to be mounted and fixed to the airbag main body 10a. In addition, the left and right side wall portions rise with respect to this mounting and fixing portion while tip end parts of the left and right side wall portions are jointed with each other, and these side wall portions each are formed in a cylindrical shape.

Also, in a region which is arranged between the upper and lower opening end parts 19b, 19c, in the mounting and fixing portion of the cylindrical inner cloth portion 19, an inner opening portion 19a is formed, and the inner cloth portion 19 thus formed is fixed and mounted to the first base cloth 11 of the airbag main body 10a in a state in which a position of the inner opening portion 19a that is provided in the mounting and fixing portion (the bottom face portion) is superimposed with the gas introduction opening 12 that is provided in the first base cloth 11 of the airbag main body 10 and then the inner opening portion 19a of the inner cloth portion 19 and the gas introduction opening 12 of the airbag main body 10a are caused to communicate with each other.

Thus, when the inflation gas that is generated in the inflator 9 is supplied and then the airbag main body 10a inflates and expands, the inflation gas that is generated in the inflator 9 having been thus supplied is introduced into the inner cloth portion 19 via the gas introduction opening 12 of the airbag and the inner opening portion 19a on a side face of the inner cloth portion 19, and further, the introduced gas is blown out to the inside of the airbag main body 10*a* through openings at the upper and lower end parts of the inner cloth portion 19.

Also, the inner cloth portion 19, as shown in FIG. 4, may be formed by employing one cloth having the inner opening portion 19*a* provided at a center thereof to thereby mount and fix the inner opening portion 19*a* in accordance with the gas introduction opening 12 of the airbag and then jointing tip ends of the left and right side wall portions with each other, or alternatively, this inner cloth portion may be formed by respectively mounting and fixing one end parts of two cloths to the periphery of the gas introduction opening 12 of the airbag and then jointing the other end parts with each other.

Further, this inner cloth portion may be formed by: providing, at one end parts of two cloths, cutout portions configured to form the inner opening portion 19*a* in a case where these two cloths come into contact with each other; arranging the inner opening portion 12 in order; mounting and fixing the inner opening portion 19*a* having been thus formed; and then, jointing tip ends of the left and right side wall portions.

In a case where this inner cloth portion 19 is fixed to the first base cloth 11 of the airbag main body, the reinforcement cloth 17 that is knitted from a yarn made of a material such as polyamide or polyester is arranged in proximity to the mounting hole 14 at the peripheral edge of the gas introduction opening 12 on the inner circumferential face side of the airbag 10; and therefore, in a state in which this reinforcement cloth 17 is sandwiched therebetween, the inner cloth portion 19 is fixed to the first base cloth 11 of the airbag main body 10*a* by way of sewing.

In particular, in the case of the present embodiment, as shown in FIG. 4, the inner cloth portion 19 is sewn with the reinforcement cloth 17 at a joint seam C and further the reinforcement cloth 17 is sewn with the first base cloth 11 at a joint seam B. Also, in so far as this reinforcement cloth 17 is concerned, an opening portion 17*a* is formed in a position corresponding to a respective one of the positions at which the gas introduction opening 12 of the airbag 10 and the inner opening portion 19*a* of the inner cloth portion 19 are formed.

It is to be noted that, in the present invention, it is possible to arbitrarily select whether or not to arrange the reinforcement cloth 17 between the airbag main body 10*a* and the inner cloth portion 19, and in a case where the reinforcement cloth 17 as described above is not arranged, the inner cloth portion 19 is directly sewn with the first base cloth 11 of the airbag main body 10*a*.

Also, means for fixing the inner cloth portion 19 to the airbag main body 10*a* is not limited in particular, and for example, merely by inserting the mounting bolts 71*a* of the retainer 7 via the respective mounting holes 14 that are formed in the inner cloth portion 19 and the airbag main body 10*a*, the inner cloth portion 19 may be mounted and fixed to the airbag main body 10*a*.

In the present embodiment, the inner cloth portion 19, as shown in FIG. 5, is constructed by overlapping the left and right terminal edge parts of the inner cloth element 18 formed in a substantially rectangular shape and then sewing these two edge parts in a cylindrical shape. In this case, the inner cloth portion element 18 formed in the substantially rectangular shape is provided with an opening portion 18*a* serving as an inner opening portion 19*a* at a center part so as to correspond to the gas introduction opening 12 of the airbag main body 10*a*, and this element is also provided with left and right belt portions 18*b* and 18*b*' which extend from the center part in a transverse direction (in a vehicle widthwise direction).

Therefore, the inner cloth portion 19 is foamed in a cylindrical shape of which an upper end and a lower end are configured to open, by overlapping and sewing tip terminal edge parts of the left and right belt portions 18*b* and 18*b*' with each other (that is, terminal edge parts on two edges which are opposite to each other, of the inner cloth portion element 18 formed in the substantially rectangular shape), and in a cylindrical barrel part of this inner cloth portion 19 formed in the cylindrical shape, the inner opening portion 19*a* corresponding to the gas introduction opening 12 is formed.

Next, a method for manufacturing the airbag 10 of the present embodiment will be described. First, as shown in FIG. 4 and FIG. 5, the inner cloth portion element 18 is sewn with the reinforcement cloth 17 at the joint seam C by employing a sewing yarn, and further, the reinforcement cloth 17 is sewn with an opening peripheral edge part of the gas introduction opening 12 of the first base cloth 11 at the joint seam B by employing a sewing yarn. Subsequently, tip terminal edge parts of the left and right belt portions 18*b* and 18*b*' of the inner cloth portion element 18 are sewn with each other at a joint seam D by employing a sewing yarn, as shown in FIG. 4, thereby forming the inner cloth portion 19 in the shape of a cylinder of which an upper end part and a lower end part are configured to open. After that, the second base cloth 16 is overlapped with the first base cloth 11, outer circumferential edge parts of the first and second base cloths 11, 16 that are overlapped with each other are also sewn with each other at the joint seam A by employing a sewing yarn and then the airbag main body 10*a* is formed in the shape of a bag.

In this case, a joint portion which is exerted by way of sewing or the like of the end parts of the left and right belt portions 18*b* and 18*b*' of the inner cloth portion element 18 is adjusted so as to break when folding of the airbag main body 10*a* is eliminated and then the airbag main body 10*a* inflates and expands, in particular, at a stage at which the airbag main body 10*a* is expanded in a vertical direction and in a transverse direction, or alternatively, at a stage at which the airbag main body 10*a* is caused to expand and inflate to a rear side of a vehicle.

In general, time intervals from generation of the inflation gas to the elimination of folding of the airbag 10 and then the completion of expansion and inflation in a vertical direction are on the order of about 15 msec, and the temperature and pressure of the inflation gas that is supplied in this duration gradually increase. Thus, in so far as the inner cloth potion 19 of the present embodiment is concerned, a strength at the joint portion of the inner cloth portion 19 (that is, a jointing strength between end parts of the belt portions 18*b* and 18*b*' of the inner cloth portion element 18) is adjusted in such a manner that a breakage takes place at the temperature and pressure of the inflation gas within a predetermined period of time after the inflation gas has been generated.

In this case, the strength of the joint portion of the inner cloth portion 19 is controlled at a predetermined magnitude, for example, by adjusting the strength of a yarn employed for the sake of sewing, adjusting the density of a sewing yawn, and providing slits in the belt portions 18*b*, 18*b*', etc.

Thus, at a predetermined stage at which the airbag 10 is caused to expand and inflate to the rear side of the vehicle, by breaking the joint portion of the inner cloth portion 18, a local concentration of the inflation gas with respect to the airbag main body 10*a* can be prevented, and the expansion and inflation that are oriented to the rear side of the vehicle of the airbag 10 can be smoothly carried out at a predetermined behavior.

It is to be noted that, in FIG. 4, a joint seam between the tip terminal edge parts of the left and right belt portions 18*b* and 18*b*' of the inner cloth portion element 18 (that is, a joint portion of the inner cloth portion 19) is provided in parallel to a center axis of the inner cloth portion 19 that is formed in a cylindrical shape.

However, in the present invention, as long as a breakage at the joint portion of the inner cloth portion 19 takes place within an appropriate period of time as described above, the joint portion of the inner cloth portion 19 does not need to be parallel to the center axis of the inner cloth portion 19. For example, depending on the position or size of the inner cloth portion 19, or alternatively, depending on the position or the like of the inflator 9, the joint portion of the inner cloth portion 19 may be provided in an oblique orientation with respect to the center axis, or alternatively, the joint seam D of the inner cloth portion 19 can be formed in a curved shape or in a zigzag shape in place of being formed in a linear shape.

After the airbag 10 has been formed by carrying out sewing as described above, the retainer 7 is housed in the airbag main body 10a, and the retainer thus housed is disposed inside of the inner cloth portion 19, and further, the mounting bolts 71a of the retainer 7 are protruded to the outside of the airbag 10 via the respective mounting holes 14 that are formed in the inner cloth portion 19, the reinforcement cloth 17, and the airbag main body 10a. In this manner, the retainer 7 is mounted to the airbag 10 (in other words, the airbag 10 is retained by the retainer 7).

After the retainer 7 has been mounted to the airbag 10, the airbag 10 is folded together with the inner cloth portion 19 in accordance with a predetermined procedure. Now, the processing steps of folding the airbag 10 will be described with reference to FIG. 6. It is to be noted that the processing steps of folding the airbag 10 to be described hereinafter is merely provided as an example, the present invention is not limited thereto, and the airbag can also be folded by employing another procedure or method.

Figure 6:
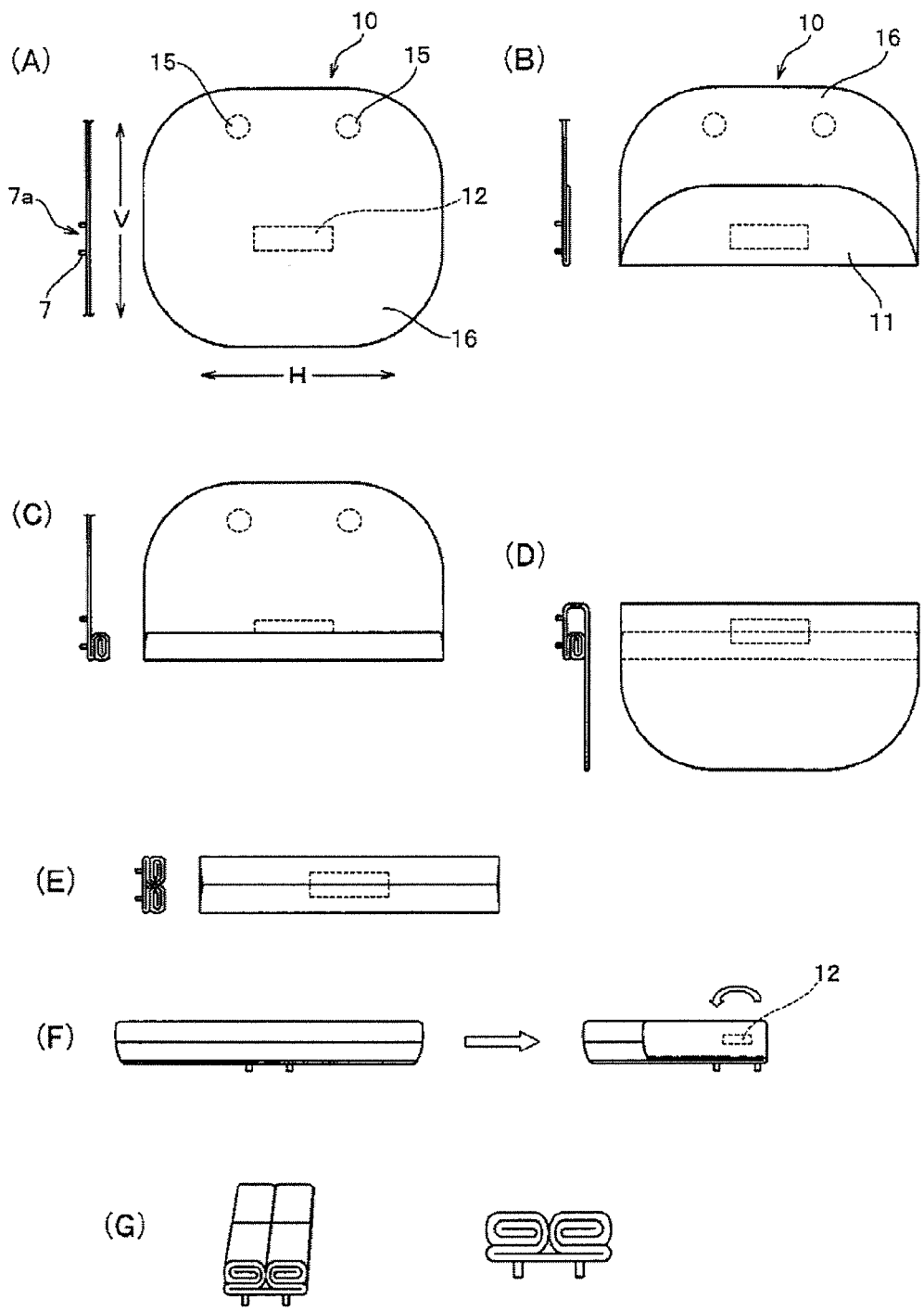
FIG. 6 is an illustrative view illustrating the steps of folding the same airbag.

FIG. 6 illustrates the steps of folding the airbag 10 that is formed by sewing the first base cloth 11 and the second base cloth 12 with each other after mounting the airbag to the retainer 7, whereas the figure mainly showing a rear view and a side view of the airbag 10 in the respective folding steps. It is to be noted that, although not shown in FIG. 6, in this embodiment, the inner cloth portion 19 in the airbag 10 is disposed so that upper and lower opening end parts 19b, 19c thereof are oriented in a vertical direction.

In FIG. 6, a direction H indicated by the arrow designates a vehicle widthwise direction (a transverse direction of the airbag 10), and a direction V indicated by the arrow designates a height direction (a vertical direction of the airbag 10). It is to be noted that, in the rear view of the airbag 10, the gas introduction opening 12 and the vent hole 15 are provided on the first base cloth 11 that is situated on a back side of the second base cloth 16.

FIG. 6 (A) shows the airbag 10 in which the retainer 7 is mounted to a retainer mounting portion 7a which is arranged at a peripheral edge part of the gas introduction opening 12 (and the inner opening portion 19a of the inner cloth portion 19). The airbag 10 has the first base cloth 11 on a front face (frontal face) side, and also has the second base cloth 16 on a rear face (back face) side, and further, at an upper end part of the first base cloth 11 on the front side, left and right vent holes 15 are provided.

As shown in FIG. 6 (A) and FIG. 6 (B), an end part situated in a vertical direction of the airbag main body 10a, the end part being also situated on a side which does not have the vent holes 15 (a lower end part in the case of this embodiment), is inwardly folded along a lower end part of the retainer mounting portion 7a and then is folded back to an upper side on an opposite side. At this time, a lower opening end part 19c of the inner cloth portion 19 that is mounted and fixed in the airbag main body 10a is also folded back together in a state in which the lower opening end part is sandwiched between the first base cloth 11 and the second base cloth 16 of the airbag main body 10a. Subsequently, the folded back end part (the lower end part) of the airbag main body 10a is further folded back by way of a plurality of times of inward roll folding so as to be oriented in an original direction (to a lower side) while a fold taken along a widthwise direction (a transverse direction) is formed.

In this manner, a first winding portion on a lower side on which the lower opening end part 19c of the inner cloth portion 19 is folded together with the airbag main body 10a is formed, and the state shown in FIG. 6 (C) is established. In this case, in the present embodiment, the lower opening end part 19c of the inner cloth portion 19 is integrally folded at the first winding portion having thus folded a lower halve portion of the airbag main body 10a. That is, the lower opening end part 19c of the inner cloth portion 19 is integrally folded at a fold portion of a first stage which is the most proximal to the side of the gas introduction opening 12 having thus folded the lower halve portion of the airbag main body 10a.

Next, the other end part in the vertical direction of the airbag 10, the end part being on a side having the vent hole 15 (an upper end part in the case of this embodiment), as shown in FIG. 6 (D), is also inwardly folded along an upper end part of the retainer holding portion 7a and then is folded back to a lower side on an opposite side, similarly. At this time, the upper opening end part 19b of the inner cloth portion 19 that is mounted and fixed into the airbag main body 10a is also folded back in a state in which the upper opening end part is sandwiched between the first base cloth 11 and the second base cloth 16 of the airbag main body 10a.

Subsequently, the folded back end part (the upper end part) of the airbag main body 10a is further folded back by way of a plurality of times of inward roll folding so as to be oriented in an original direction (to an upper side) while a fold taken along a widthwise direction (a transverse direction) is formed.

In this manner, a first winding portion on an upper side on which the upper opening end part 19b of the inner cloth portion 19 is folded together with the airbag main body 10a is formed, and the state shown in FIG. 6 (E) is established. In this case, in the present embodiment, the upper opening end part 19b of the inner cloth portion 19 is folded together with the first winding portion having thus folded an upper halve portion of the airbag main body 10a in a state in which the upper opening end part is folded back one time. That is, the upper opening end part 19b of the inner cloth portion 19 is integrally folded at a fold portion which is the most proximal to the side of the gas introduction opening 12 of the first winding portion having thus folded the upper halve portion of the airbag main body 10a.

It is to be noted that, in the present embodiment, the upper opening end part 19b and the lower opening end part 19c of the inner cloth portion 19 are folded together with the airbag main body 10a and then are established in a state in which these two opening end parts are folded back one time (a state in which these end parts are folded only at a fold portion at a first stage which is the most proximal to the side of the gas introduction opening 12). However, in the present invention, for example, according to the layout of a vehicle or the arrangement position of the airbag device, the upper opening end part 19b and/or the lower opening end part 19c of the inner cloth portion 19 may be folded back two times in place of being folded one time so as to be thereby folded integrally with the fold portion at the first stage that is the most proximal to the side of the gas introduction opening 12 of the first winding portion.

Next, as shown in FIG. 6 (F), one end part situated in a transverse direction of the airbag 10, which is folded in a vertical direction, and at which the first winding portion is formed (a right end part in the case of this embodiment), is inwardly folded along a right side edge part of the retainer mounting portion 7a and then is folded back in a leftward direction on an opposite side. Subsequently, the folded back right end part is further folded back by way of a plurality of times of inward roll folding so as to be oriented in an original rightward direction while a fold taken along the vertical direction is formed. In this manner, the second winding portion on the right side is formed.

After that, the other left end part situated in the transverse direction of the airbag 10 is also inwardly folded along a left side edge part of the retainer mounting portion 7a and then is folded so as to be oriented in a rightward direction on an opposite side, similarly. Subsequently, the folded back left end part is further folded back by way of a plurality of times of inward rolling so as to be oriented in an original leftward direction while a fold taken along the vertical direction is formed. In this manner, a second winding portion on the left side is formed, and the state shown in FIG. 6 (G) is established.

Further, after the airbag 10 has been folded as described above, the airbag 10 thus folded is wrapped and fixed by a breakable wrapping sheet (not shown) so that the first winding portion and the second winding portion are not folded and deformed. Also, in so far as the airbag 10 of which the folded state is fixed by the wrapping sheet is concerned, the inflator 9 is mounted to the retainer 7 and further the airbag is housed and retained in the case 4 together with the inflator 9, whereby an airbag device 20 as shown in FIG. 2 is constructed.

In the thus constructed airbag device 20 of the present embodiment, if an inflation gas is generated from the inflator 9 owing to a collision or the like of a vehicle, the inflation gas is first supplied to the inner cloth portion 19 that is formed in a cylindrical shape and then the inner cloth portion 19 is caused to inflate.

At this time, the upper opening end part 19b and the lower opening end part 19c of the inner cloth portion 19 are folded together with the airbag main body 10a; and therefore, the inflation gas is blown out from the upper opening end part 19b and the lower opening end part 19c of the inner cloth portion 19 to the inside of the airbag main body 10a while a vertical folding of the first winding portion that has been folded earlier is partially eliminated so as to restore the fold-backs of the upper opening end part 19b and the lower opening end part 19c. In this manner, the airbag main body 10a inflates and expands in the transverse direction so as to eliminate a transverse folding of the second winding portion that has been folded later while partially eliminating the vertical folding of the first winding portion.

Further, in so far as the airbag main body 10a is concerned, the flow of the inflation gas is oriented in the vertical direction by the inner cloth portion 19 while the inflation and expansion in the transverse direction is advanced; and therefore, the inflation and expansion in the vertical direction can also be effectively accelerated so as to eliminate the vertical folding of the first winding portion.

Therefore, the airbag 10 of the present embodiment is capable of speedily and widely expanding the airbag main body 10a in the vertical and transverse directions, a respective one of which is orthogonal to the occupant's side direction, and then, inflating the airbag in a stable manner so as to be oriented to a rear side of a vehicle, in particular, so as to be oriented to the rear side of the vehicle while being taken along a front wind shield, with a simple structure without a need to employ a specific control device or a specific structure.

In this manner, even in a case where an occupant is seated in proximity to the instrument panel 1 or is seated at a forward bent posture, for example, the airbag 10 of the present embodiment can be efficiently widened in a direction which is orthogonal to the occupant's side direction; and therefore, the occupant can be buffered and supported in a stable manner by the airbag 10 in a wide area from a front side, and the safety of the occupant can be appropriately ensured.

In particular, in so far as the airbag 10 of the present embodiment is concerned, as described above, after the first winding portion has been formed by winding and folding the upper opening end part 19b and the lower opening end part 19c of the inner cloth portion 19 so as to be oriented in the vertical direction, the second winding portion is formed while the first winding portion is folded in the transverse direction. Thus, if the inflation gas is supplied to the inner cloth portion 19 and then is blown out to the inside of the airbag main body 10a, the airbag can be expanded so as to eliminate folding of the second winding portion that has been folded later, at a time point which is earlier than that of the first winding portion.

In this manner, the airbag 10 can be opened earlier; and therefore, the occupant can be protected by the airbag that has widely opened in the transverse direction and the vertical direction, a respective one of which is orthogonal to the occupant's side direction.

Moreover, in so far as the airbag 10 of the present embodiment is concerned, a joint portion which is sewn at the joint seam D of the inner cloth portion 19 is formed so as to have a breakable strength with the joint portion being subjected to the temperature and pressure of the inflation gas while inflation and expansion of the airbag are in progress. In this manner, the airbag 10 can be caused to actively inflate and expand in the vertical direction while the flow of the inflation gas is accelerated in the vertical direction at the initial stage of the inflation and expansion of the airbag 10.

In addition, after a predetermined period of time has elapsed after the inflation gas has been generated from the inflator 9, in other words, after the airbag 10 has inflated and expanded up to a predetermined stage (for example, after the airbag 10 has inflated and expanded up to a certain degree of wideness in the transverse direction and the vertical direction), the joint portion of the inner cloth portion 19 breaks owing to the temperature and pressure of the inflation gas, a respective one of which gradually increases, whereby a rectification action of the inflation gas exerted by the inner cloth portion 19 completes.

In this manner, it is possible to prevent the inflation gas from being locally intensively blown at a part of the airbag main body 10 until the inflation and expansion has completed; and therefore, there is no need to carry out a partial reinforcement with respect to the airbag main body 10, and its related manufacturing costs can be reduced. Further, owing to a breakage of the joint portion of the inner cloth portion 19, the inflation gas can be efficiently delivered all over the airbag 10; and therefore, the expansion and inflation of the airbag can be smoothly carried out at a predetermined behavior.

It is to be noted that the present invention is not limited to the embodiment described above, and a variety of modifications can occur as long as it is possible to have a construction which is substantially identical to that of the present invention and to attain an advantageous effect similar thereto. For example, although the airbag device 20 of FIG. 1 is described with respect to a case in which the airbag device is arranged inside of the top face 1*a* of the instrument panel 1 in front of a passenger's seat, the airbag device 20 of the present invention can be similarly applied to an airbag device which is equipped in another portion of a vehicle such as a steering wheel (for example, an airbag device for driver's seat).

What is claimed is:

1. An airbag comprising:
an airbag main body that is provided with a gas introduction opening of an inflation gas without a need to employ a specific control device; and
an inner cloth portion that is mounted and fixed so as to cover the gas introduction opening in the airbag main body, the airbag main body being caused to inflate and expand by the inflation gas,
wherein the inner cloth portion comprises:
a first opening end part at which one end in a lengthwise direction opens as a gas outflow opening; and
a second opening end part at which the other end in the lengthwise direction opens as a gas outflow opening,
wherein a mounting and fixing portion of the inner cloth portion is fixed to a circumferential edge part of the gas introduction opening of the airbag main body while a position of the inner cloth portion is superimposed with the gas introduction opening of the airbag main body, and
wherein the first opening end part and the second opening end part of the inner cloth portion is folded in a predetermined procedure together with the airbag main body in a state in which the first and second end parts are sandwiched between base cloths constituting the airbag main body.

2. The airbag according to claim 1, wherein the inner cloth portion is arranged so that the first opening end part and the second opening end part are oriented in a vertical direction.

3. The airbag according to claim 2, wherein the airbag comprises:
a first winding portion which is folded and formed with the airbag main body being oriented in a vertical direction while the first opening end part and the second opening end part of the inner cloth portion are wound at a fold taken along a transverse direction; and
a second winding portion which, after the first winding portion has been formed, is folded and formed with the airbag main body being oriented in a transverse direction at a fold taken along the vertical direction.

4. The airbag according to claim 1, wherein:
the inner cloth portion is constructed in a cylindrical shape by employing a base cloth formed in a rectangular shape of one so as to thereby overlap terminal edge parts of two edges which are opposite to each other, of the base cloth, and then, jointing the terminal edge parts that are overlapped with each other, and
the jointing between the terminal edge parts of the inner cloth portion has a strength which is breakable while inflation and expansion of the airbag are in progress.

5. An airbag device comprising:
an airbag according to claim 1;
an inflator configured to generate an inflation gas; and
a retainer configured to retain the inflator and the airbag, wherein
the inflation gas is supplied into the inner cloth portion and then flows into the airbag main body via the gas outflow opening of a respective one of the first opening end part and second opening end part of the inner cloth portion to thereby cause the airbag main body to inflate and expand.

6. An airbag comprising:
an airbag main body that is provided with a gas introduction opening of an inflation gas; and
an inner cloth portion that is mounted and fixed so as to cover the gas introduction opening in the airbag main body, the airbag main body being caused to inflate and expand by the inflation gas,
wherein the inner cloth portion comprises:
a first opening end part at which one end in a lengthwise direction opens as a gas outflow opening; and
a second opening end part at which the other end in the lengthwise direction opens as a gas outflow opening,
wherein a mounting and fixing portion of the inner cloth portion is fixed to a circumferential edge part of the gas introduction opening of the airbag main body while a position of the inner cloth portion is superimposed with the gas introduction opening of the airbag main body, and
wherein the first opening end part and the second opening end part of the inner cloth portion is folded in a predetermined procedure together with the airbag main body in a state in which the first and second end parts are sandwiched between base cloths constituting the airbag main body,
the airbag comprises:
a first winding portion which is folded and formed with the airbag main body being oriented in a vertical direction while the first opening end part and the second opening end part of the inner cloth portion are wound at a fold taken along a transverse direction; and
a second winding portion which, after the first winding portion has been formed, is folded and formed with the airbag main body being oriented in a transverse direction at a fold taken along the vertical direction.

* * * * *